United States Patent [19]
Crites

[11] 3,878,722
[45] Apr. 22, 1975

[54] REVERSIBLE, DISPOSABLE CLINICAL THERMOMETER

[75] Inventor: Nelson Allen Crites, Columbus, Ohio

[73] Assignee: Abbott Laboratories, North Chicago, Ill.

[22] Filed: Apr. 2, 1973

[21] Appl. No.: 345,941

[52] U.S. Cl. .................. 73/356; 73/358; 116/114.5
[51] Int. Cl. ............................................ G01k 11/06
[58] Field of Search .......... 73/356, 358; 116/114 V, 116/114.5

[56] References Cited
UNITED STATES PATENTS

| | | | |
|---|---|---|---|
| 3,125,984 | 3/1964 | Okuyama | 116/114 V |
| 3,576,129 | 4/1971 | Crites | 73/358 |
| 3,580,079 | 5/1971 | Crites | 73/358 |

*Primary Examiner*—S. Clement Swisher
*Assistant Examiner*—Denis E. Corr
*Attorney, Agent, or Firm*—Aaron L. Hardt; Robert L. Niblack

[57] ABSTRACT

A reversible, disposable thermometer having an indicia of temperature spaced apart from a viewing window. A temperature-responsive material which is not transparent in its solid state is disposed within bores distributed within the window. When in the solid state, the temperature-responsive material acts as a shutter to obscure a legible view of the indicia through the window. When the temperature of the thermometer is raised to the temperature represented by the indicia, the temperature-responsive material melts and becomes transparent, thus rendering visible the indicia of temperature, while remaining held by capillary attraction within the bores. When the temperature of the thermometer decreases below the solidification point of the temperature-responsive material, the material remains in the bores and again becomes opaque or translucent, thereby permitting a re-use of the thermometer.

9 Claims, 8 Drawing Figures

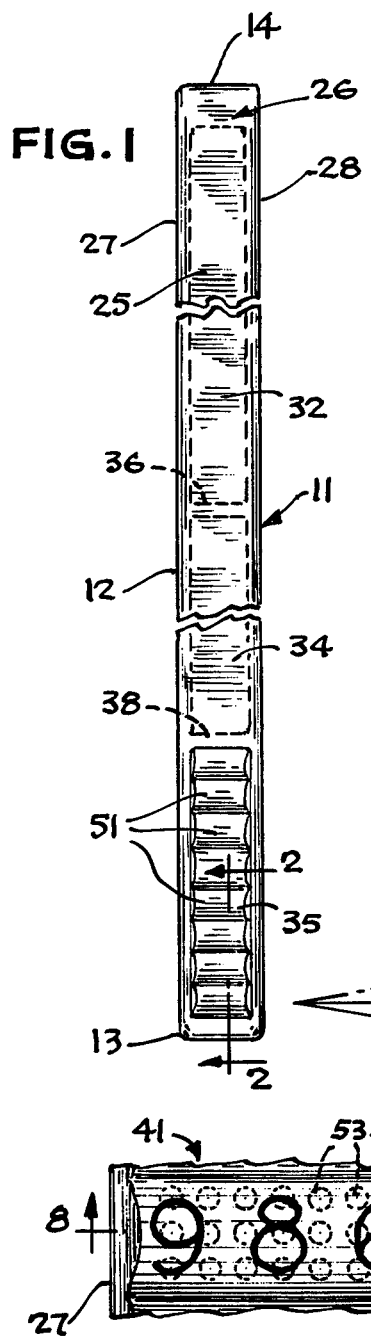
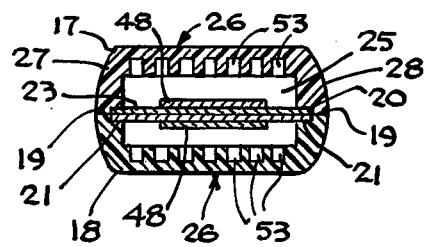
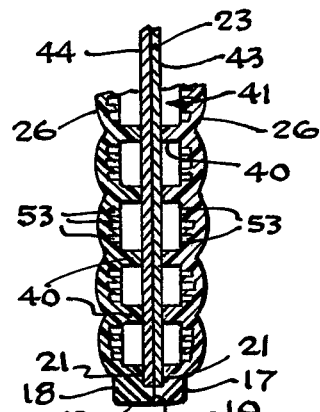
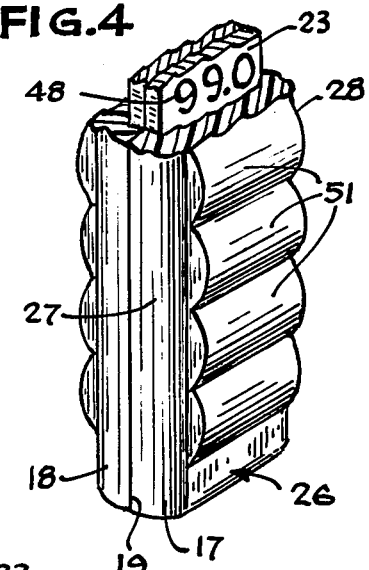
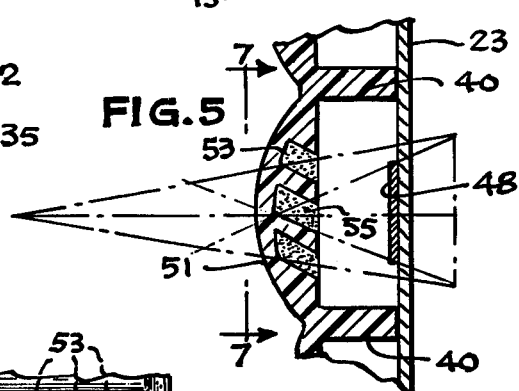
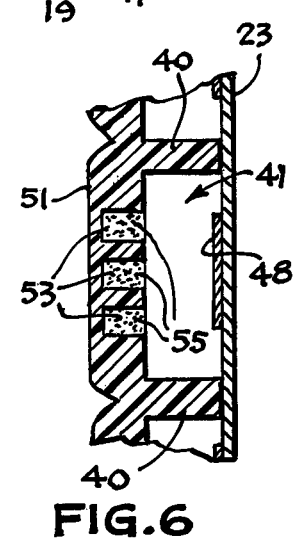
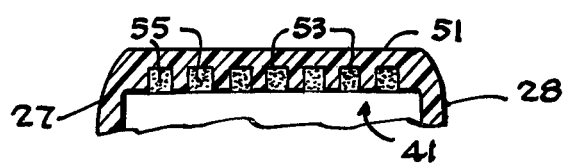

REVERSIBLE, DISPOSABLE CLINICAL THERMOMETER

BACKGROUND OF THE INVENTION

This invention relates to temperature measurement. More particularly, this invention relates to reversible, disposable thermometers, and especially to disposable thermometers suitable for measuring the temperature of the human body.

When diagnosing a patient's complaint, a measurement of the patient's body temperature is routinely taken to detect any deviation from the normal temperature range, which information may aid in the diagnosis. Similarly, the temperature of hospitalized patients is regularly taken and recorded to chart their conditions and indicate their responses to administered medications. Recently, disposable thermometers have become popular for these uses, for aseptic and economic reasons. Two such thermometers are described in U.S. Pat. Nos. 3,576,129 and 3,580,079.

While the very virtue of disposable thermometers is their single use feature, it is nevertheless often desirable, for various reasons, to retake an individual patient's temperature immediately after reading it, or at some time soon thereafter. Unfortunately, many presently known disposable thermometers are irreversible. That is, once a temperature has been registered thereon, the thermometer cannot be used again with reliability, due to the physical characteristics of the thermometer. Furthermore, of those presently known disposable thermometers that are reversible, those based on the melting of a solid material to indicate temperature use such a large volume of solid material that the temperature response time is unduly prolonged.

SUMMARY OF THE INVENTION

Therefore, the primary purposes of this invention are to provide an inexpensive, disposable thermometer that can be individually packaged free from contamination, that is reversible, accurate, easily read, and suitable for either oral or rectal human use.

In accordance with these and other objects, there is provided by the present invention a reversible disposable thermometer in which temperature-responsive materials that are transparent in the liquid state and not transparent in the solid state are permanently disposed within bores distributed in a window spaced apart from an indicia of temperature. When in the solid state, the temperature-responsive material acts as a shutter to obscure a legible view of the indicia through the window. When the temperature of the thermometer is raised to the temperature represented by the indicia, the temperature-responsive material melts and becomes transparent, thus rendering visible the indicia of temperature, while remaining held by capillary attraction within the capillary bores. When the temperature of the thermometer decreases below the solidification point of the temperature-responsive material, the material remains in the bores and again becomes opaque or translucent, thereby permitting a re-use of the thermometer.

In the preferred embodiment, the thermometer of the present invention comprises a probe of a shape suitable for at least partial insertion thereof into a body cavity in the same manner as presently used mercury capillary thermometers. Another portion of the thermometer provides a handle means for manipulating the probe portion into a proper position for temperature measurement and for holding it during removal and reading. The probe portion of the thermometer houses a plurality of cells defined by top, bottom and side walls. The top wall of each cell includes the aforementioned indicia of temperature on its interior and the bottom wall of each cell includes the aforementioned window having bores with the temperature-responsive material disposed therein.

In addition to being reversible, the thermometer of the present invention obviates at least two other problems inherent in previously known disposable thermometers. Because less temperature-responsive material is required in the bores of the present thermometer than otherwise would be used to obscure the indicia of the temperature, the response time for the phase change from solid to liquid is therefore decreased. Also, since the melted temperature-responsive material is confined in the bores by capillary attraction and does not spread on the window surface as a wetting film, the problem of the melted temperature-responsive material forming a meniscus within the cell is avoided. Such a meniscus not only distorts the image of the indicia, it frequently allows an air bubble to form in the melted material, thereby rendering the indicia illegible.

BRIEF DESCRIPTION OF THE DRAWINGS

Additional objects, advantages and functions of this invention will become apparent on reference to this specification and to the attached drawing illustrating the preferred embodiment of this invention, in which like elements are identified by like reference numerals in each of the views, and in which:

FIG. 1 is a top plan view of the preferred embodiment of the thermometer of the present invention having a plurality of cells at a probe end thereof;

FIG. 2 is a longitudinal cross-section view through the cells of FIG. 1 along line 2—2 showing a plurality of bores in the bottom wall of each cell;

FIG. 3 is a lateral cross-sectional view through the cells shown in FIG. 1 showing a plurality of bores in the bottom walls thereof;

FIG. 4 is an isometric view of the probe portion of the thermometer shown in FIG. 1 illustrating the placement of the indicia of temperatures;

FIG. 5 is an enlarged view of a single cell shown in FIG. 2 illustrating the objects of the preferred embodiment of the present invention;

FIG. 6 is a view similar to FIG. 5, but after the temperature-responsive material disposed in the bores of the inner surface of the bottom wall has liquified;

FIG. 7 illustrates how the temperature-responsive material of the present invention obscures the indicia of temperature; and FIG. 8 is a view along line 8—8 of FIG. 7 showing another placement of the temperature-responsive material within the bores of the bottom wall of a cell.

DETAILED DESCRIPTION OF THE INVENTION

Referring now to the drawings and particularly FIG. 1, there is shown a thermometer 11 that comprises a housing 12 having a first end 13 and a second end 14. For clarity, thermometer 11 is shown in FIG. 1 approximately 2 times the size of its preferred embodiment. In the other figures, the views are likewise enlarged. In human practice, the size of thermometer 11 is, of course, dictated by the necessity for comfortable insertion into body openings and the need for legible readings.

Housing 12 is constructed from a nontoxic substance that is sufficiently rigid to withstand insertion into body cavities, yet not so brittle that it can break apart if subjected to unexpected forces; if bitten for example. While glass is acceptable, a resinous plastic polymer that can be formed by injection molding is preferred, and since at least a portion of housing 12 must be transparent to light transmission, the acrylics are especially suited.

In the preferred embodiment, as seen by reference to FIGS. 2-4, housing 12 comprises two substantially identical shells 17 and 18, that are joined together about their periphery along surface 19 by means of an adhesive or ultrasonic welding. Because the solvents used in some adhesives exert a vapor pressure sufficient for the vapor to dissolve in or migrate to the temperature-responsive materials used in thermometer 11, the use of ultrasonic welding is preferred.

About the inner periphery of each shell 17 and 18 is a recess 20 having a shoulder 21 for supporting a plaque 23. When shells 17 and 18 are sealingly engaged to one another along edge 19, plaque 23 rests at the juncture of the shells in the slot formed by the cooperation of their respective recesses 20 and shoulders 21.

When shells 17 and 18 are joined together, including plaque 23 supported therebetween, there is formed in housing 12, a hollow core 25. Core 25 is defined by ends 13 and 14, the bottom wall 26 of each shell 17 and 18 and the side walls 27 and 28 which are formed by the juncture of the two shells about edge 19. Core 25 comprises three sections 32, 34 and 35. Section 32 extends from end 14 to lateral wall 36; section 34 from wall 36 to lateral wall 38; and section 35 from wall 38 to end 13. The hollow core 25 in sections 32 and 34 serve to conserve material and thereby provide a thermometer that is light in weight, yet sufficiently strong and flexible. Lateral walls 36 and 38 being contiguous with shoulders 21 in shells 17 and 18, not only supply support for plaque 23, but also provide additional assurance of structural integrity during flexure to housing 12.

Sections 32 and 34 of core 25 occupy that portion of thermometer 11 that serves as the handle during use, while section 35 forms the operational portion of thermometer 11. Lateral walls 40 contiguous with shoulder 21 divide section 35 of core 25 into a plurality of cells 41 on either side of plaque 23. Thus, an individual cell 41 is defined by lateral walls 40, bottom wall 26, side walls 27 and 28, and top wall: plaque 23. While thermometer 11 preferably provides an indicia of temperature for every 0.5° F: between 96°-106° F., it will be readily apparent that embodiments of the present thermometer comprising any number of cells and any range of temperatures can be made.

On the surface of each side 43 and 44 of plaque 23, there are imprinted indicia of temperature 48 (shown in FIGS. 3-7) that register with viewing window portions 51 of bottom walls 26. Each cell 41 includes an indicia 48 and a window 51. Windows 51 can be planar surfaces, but preferably comprise magnifying lens suitable for viewing an enlarged, upright virtual image of indicia 48, as illustrated in FIG. 5. Although the cylindrical planoconvex lens are preferred because more uniform magnification of indicia 48 is obtained, other magnifying lens, including convex and spherical lens are acceptable.

The window portion 51 of the bottom wall 26 of each cell 41 includes a plurality of bores 53 on its inside. Preferably, the bores do not extend the entire width of the window 51, although they could if so desired. Further, the plurality of bores 53 in each cell lies substantially opposite the indicia of temperatures 48 for each cell. As seen in FIGS. 5 and 6, the axis of each bore 53 can either be at a right angle or oblique to the top wall 23 of cell 41.

In each cell 41, the bores 53 have disposed therein a temperature-responsive material 55 that is transparent to ordinary light in its liquid state and not transparent to light when in its solid state. The particular material 55 employed in each cell 41 is chosen for its capacity to rapidly melt at the temperature represented by the indicia of temperature mounted on the top wall: plaque 23 of that cell. The temperature-responsive material 55 can be either a pure material or a mixture of materials selected to have the desired melting point. There are many substances known in the art that have sharp melting points and are suitable for use as the temperature-responsive material 55, such as capric and lauric acid. Further examples of substances suitable for materials 55 are given in U.S. Pat. No. 3,002,385; granted Oct., 1961, to Wahl et al.

When the temperature of thermometer 11 is below the melting point of the temperature-responsive material 55 of a cell 41, material 55 acts as a shutter to obscure a legible view of the indicia of temperature 48 of that cell. The number and size of bores 53 incorporated in each cell 41 can be varied to provide a desired obscuring of indicia 48, as illustrated in FIGS. 5-8. Preferably, the amount of material 55 used should be minimized to provide as rapid a response time as possible.

When the temperature of thermometer 11 or the ambient temperature around portion 35 of thermometer 11 is raised to a given temperature within an operable range of the thermometer, the temperature-responsive materials 55 for each cell 41 representing a temperature below or equal to that given temperature melts and becomes transparent, thereby rendering visible the indicia of temperature 48 of its respective cell 41, while remaining held by capillary attraction within the capillary bores 53. The highest temperature represented by the indicia of temperatures 48 then visible indicates the temperature to which the thermometer was exposed. After the temperature of thermometer 11 decreases below the solidification point of the temperature-responsive materials 55 that have melted, the materials remain in the bores 53 and again become not transparent, thereby rendering thermometer 11 suitable for further use.

While the thermometer of the present invention is described in its preferred embodiment as a thermometer for human use, it will be obvious to those skilled in the art that other uses and, therefore, embodiments of the present thermometer can be made. Such other uses conceivably could require a thermometer of a substantially different size and/or shape than that of the embodiment described hereinabove.

Having now described the invention in specific detail and exemplified the manner in which it may be carried into practice, it will be readily apparent to those skilled in the art, that innumerable variations, applications, modifications and extensions of the basic principles in- volved, may be made without departing from its sphere or scope.

That which I claim is:

1. In a thermometer comprising at least one cell defined by top, bottom and side walls; and indicia of temperature mounted on the surface of said top wall facing the interior of said cell; said bottom wall comprising a window for viewing said indicia of temperature therethrough; and a temperature-responsive material that is transparent in its liquid state and not transparent in its solid state disposed between said indicia and the outside of said bottom wall, said material selected for its capacity to melt when exposed to a temperature equal to or in excess of that represented by said indicia; the improvement which comprises:

a plurality of bores substantially spaced from said indicia on the inside of said window of said bottom wall, said bores being substantially opposite said indicia and having said temperature-responsive material permanently disposed therein by the capillary attraction between said bore and material, whereby said thermometer is rendered reversible.

2. The thermometer defined in claim 1, wherein the length of each said bore is less than the thickness of said window of said bottom wall.

3. The thermometer defined in claim 1, wherein the axis of at least one said bore lies at an oblique angle to said top wall.

4. The thermometer defined in claim 1, wherein the axis of at least one said bore lies at right angles to said top wall.

5. The thermometer defined in claim 1, wherein said window of said bottom wall comprises a lens for viewing an enlarged, upright virtual image of said indicia of temperature therethrough.

6. The thermometer defined in claim 5, wherein said lens is cylindrical planoconvex.

7. The thermometer defined in claim 1, wherein a first portion of said thermometer contains a plurality of said cells.

8. The thermometer defined in claim 7, wherein a second portion of said thermometer is adapted for use as a handle for manipulating said thermometer.

9. The thermometer defined in claim 7, wherein said cells are disposed at opposite sides of said thermometer.

* * * * *